United States Patent [19]

Metlitsky et al.

[11] Patent Number: 4,871,904
[45] Date of Patent: Oct. 3, 1989

[54] MULTIDIRECTIONAL OPTICAL SCANNER

[75] Inventors: Boris Metlitsky, Stony Brook; Mark J. Krichever, Hauppauge, both of N.Y.

[73] Assignee: Symbol Technologies, Inc., Bohemia, N.Y.

[21] Appl. No.: 138,563

[22] Filed: Dec. 28, 1987

[51] Int. Cl.⁴ .............................................. G06K 7/10
[52] U.S. Cl. .................... 235/467; 235/470; 350/6.5
[58] Field of Search ................ 235/467, 470; 350/6.5, 350/6.9, 6.91

[56] References Cited

U.S. PATENT DOCUMENTS

| | | | |
|---|---|---|---|
| 3,663,800 | 5/1972 | Myer et al. ................... | 235/61.11 E |
| 3,684,867 | 8/1972 | Acker .......................... | 235/61.11 E |
| 3,718,761 | 2/1973 | Myer ............................ | 178/7.6 |
| 3,889,102 | 6/1975 | Dahlquist ..................... | 235/467 X |
| 4,039,246 | 8/1977 | Voigt .......................... | 350/7 |
| 4,180,307 | 12/1979 | Tateoka et al. ................ | 350/6.5 |
| 4,282,431 | 8/1981 | Anthony, Jr. et al. ............ | 250/236 |
| 4,318,582 | 3/1982 | Minoura et al. ................ | 350/6.91 X |
| 4,493,989 | 1/1985 | Hampson et al. ................ | 235/464 |

*Primary Examiner*—David L. Trafton
*Attorney, Agent, or Firm*—Kirschstein, Ottinger, Israel & Schiffmiller

[57] ABSTRACT

A multidirectional scan pattern is generated by two mirrors, each inclined at a tilt angle and rotated about an axis at an angular speed. The size and shape of the pattern are controlled by adjusting the tilt angles and the angular speeds.

31 Claims, 4 Drawing Sheets

N=+2  K=1

N=+5  K=1

N=-2  K=1

N=-5  K=1

N=-2  K=2

N=-5  K=2

N = -2.25  K = 2

ONE REVOLUTION

N = -2.25  K = 2

TWO REVOLUTIONS

N = -2.25  K = 2

THREE REVOLUTIONS

N = -2.25  K = 2

FOUR REVOLUTIONS

MULTIDIRECTIONAL OPTICAL SCANNER

BACKGROUND OF THE INVENTION

1. Field of the Invention

This invention generally relates to a multidirectional optical scanner for multidirectionally scanning a light-reflecting target, such as a bar code symbol, and/or the field of view of a detector and, more particularly, to an arrangement for, and a method of, generating a multidirectional scan pattern for reading randomly-oriented bar code symbols, as well as for changing the size and/or the shape of the scan pattern.

2. Description of Related Art

Targets having indicia of different light reflectivity, such as bar code symbols, have been scanned by directing light along an optical path to a symbol located in the vicinity of a reference plane lying generally normal to the optical path. The light reflected off the symbol is detected by a detector having a finite field of view. The symbols and/or the field of view have been scanned with many different scanning patterns in the reference plane. The pattern has been a single scan line, or a set of generally parallel scan lines extending in one direction lengthwise along the symbol. See U.S. Pat. Nos. 4,251,798 or 4,387,297. The pattern has also been two sets of intersecting parallel lines extending in two directions relative to the symbol. See U.S. Pat. No. 4,369,361.

In the case of randomly-oriented symbols, it has been proposed to produce a dense scanning pattern extending in multiple scanning directions in order to maximize the probability that the symbol will be quickly read, no matter what its orientation. Thus, conventional point-of-sale (POS) scanners of the type generally found in supermarkets that have been built into and underneath check-out counters, deflect a laser beam in several directions and read symbols oriented in different directions that move across the reference plane, i.e. in the plane of or slightly above the countertop. To deflect the laser beam, a central mirrored polygon surrounded by a ring of many auxiliary mirrors is mounted below the countertop, each auxiliary mirror corresponding to a different scan line. Such constructions occupy a great deal of space and are easily accommodated under a supermarket countertop where a large amount of space is readily available. See U.S. Pat. No. 3,978,317.

It has also been proposed to generate a Lissajous scanning pattern in the reference plane. A pair of scanning elements, one deflecting a laser beam in the X-direction, and the other deflecting the laser beam in the Y-direction, are sinusoidally driven simultaneously to form a closed curved scan pattern. Although curved, the Lissajous pattern includes an interior central portion characterized by generally linear scan lines essentially orthogonally intersecting each other to form an X shape, and exterior portions characterized by sharply curved scan lines having small radii of curvature. Since such lightly curved scan lines are not useful for symbol reading, they are typically cut off, usually by sizing the exit window through which the outgoing laser beam passes en route to a symbol so as to permit passage therethrough of only the interior central portion of the Lissajous pattern, but to block the exterior portions thereof.

In order to generate truly multidirectional scan patterns, the use of holographic scanners was proposed in an article entitled "Multidirectional Holographic Scanner for Point-Of-Sale Bar-Code Symbol Reader", published in Optical Engineering, Nov.-Dec. 1984, Vol. 23, No. 6, p. 784ff. A holographic disc was rotated at one speed, and a laser beam incident on the disc was reversely rotated at another speed. The resultant outgoing beam had multidirectional scan lines. However, in the context of designing bar code symbol readers which are hand-held, or mounted on a support surface, where the available space is at a premium, and where it is desired to keep the overall size, weight and volume of the reader to a minimum, holographic discs are not practical. The holographic disc of said article is 200 mm in diameter—too big to provide the compactness desired in many applications for portable scanners; has an optical path of 350 mm—too long for many applications; and has a scan angle of ±10°—too inadequate to achieve the compactness and the length of the scan desired in many applications.

In infrared search systems, complex scan patterns were used very widely in the past. In those systems, for example, see U.S. Pat. No. 4,039,246, the field of view of a detector was accurately scanned across space at high speeds in a rosette-type pattern across the detector in a gyro-optical system mounted within a radiation-seeking missile. Convex and inclined planar reflectors were rotated to generate the scan pattern. However, such missile-mounted gyro-optical systems for detecting intruder aircraft in large areas of space were too big and complex to be used in bar code reader systems where the symbol is typically in a working range several inches, or, in some cases, several feet, from the system.

Other types of complex scan patterns were generated by prism scanners comprising a pair of optical wedge-shaped prisms positioned in front of a detector, each prism rotated relative to the other. A light beam passing through each prism was refracted at each air-prism interface. However, chromatic and other optical aberrations were often encountered with refractive prismatic elements and were largely uncorrectable. Also, the prismatic elements were only useful in certain effective wavelength regions. It was difficult to produce a wide angle of deflection. The mounting of each prism on a rotating element, and the drive for each rotating element were complex. These drawbacks rendered the prism scanners particularly unsuitable for bar code symbol reading applications.

Other optical code readers of which the applicants are aware are U.S. Pat. Nos. 3,663,800; 4,282,431; 3,718,761; 3,684,867; 4,493,989.

In all of the above-described scan pattern generators, the size and configuration of the scan pattern were not readily changeable, and certainly not during scanning. Applications exist, particularly in bar code symbol readers, where it would be desirable to either manually or automatically change the size and/or configuration of the scan pattern either prior to, or during, use.

SUMMARY OF THE INVENTION

1. Objects of the Invention

It is a general object of this invention to overcome the drawbacks, and advance the state of the art, of optical scanners, particularly bar code symbol readers.

It is another object of this invention to change the size and/or configuration of a multidirectional scan pattern.

Another object of this invention is to readily change the size and/or configuration of the scan pattern either prior to, or during, use of the scanner.

A further object of this invention is to optimize the size and/or configuration of the scan pattern.

Still another object of this invention is to enable either the user and/or the manufacturer of the scanner to readily change the size and/or configuration of the scan pattern.

Yet another object of this invention is to provide a scanner of the moving light beam type, wherein a scanning light beam spot is always in the scan pattern and travels at a non-zero velocity during scanning of a symbol.

Another object of this invention is to provide a scanner of the moving light beam type, wherein the scanning light beam spot has a velocity variation during scanning which is less than that normally encountered in known scan patterns.

Still a further object of this invention is to generate a scan pattern having an N-fold symmetry and a 100% scanning efficiency, the pattern being equally and highly dense over the field of view.

Yet a further object of this invention is to reliably read height-truncated or stationary symbols by precessing a scan pattern about an axis generally perpendicular to the plane in which the symbol to be read lies.

A further object of this invention is to provide a multidirectional scan pattern generator of simple, miniature, lightweight, rugged construction.

2. Features of the Invention

In keeping with these objects, and others which will become apparent hereinafter, one feature of this invention resides, briefly stated, in a multidirectional optical scanner for, and a scanning method of, multidirectionally scanning either a light-reflecting target located in the vicinity of a reference plane and/or a field of view of light reflected from the target, by forming a multidirectional scan pattern in the reference plane. The size and configuration of the scan pattern are separately or simultaneously changeable.

In a preferred embodiment wherein the target is a bar code symbol, a source of light, e.g. a laser or a light emitting diode, or even a non-laser light source, generates a light beam which is directed along an optical path with first and second optical elements, e.g. light-reflecting mirrors, preferably front surface planar mirrors, or prisms, to the symbol for reflection therefrom. The light scattered and reflected off the symbol is directed in countercurrent direction along the optical path and is sensed by a detector, e.g. a photodiode, over a field of view.

In accordance with this invention, first rotator means are provided for mounting the first element at a first tilt angle of inclination relative to a first axis, and for rotating the first element about the first axis at a first angular speed. Second rotator means are also provided for mounting the second element at a second tilt angle of inclination relative to a second axis, and for rotating the second element about the second axis at a second angular speed. As the first and second inclined elements rotate, the light beam extending along the path between the elements describes a generally conical surface, also called a light cone. The light deflected by the first element describes a circle in a plane perpendicular to the optical path. Every point of deflected light which impinges on the second element serves as the point of origination of another light cone. The net motion of a light beam directed onto two such rotating elements generates a multidirectional scan pattern in the reference plane whose size and configuration are a function of the velocities of each angular speed, the magnitudes of each tilt angle, and the direction of rotation of each element. By changing said velocities and/or said magnitudes and/or said rotation directions, the size and configuration of the pattern can be adjusted as desired.

Each rotator means can be implemented by a reversible or unidirectional electrical motor having an output drive shaft on which a respective optical element, e.g. a planar mirror, is transversely mounted relative to the axis along which the shaft extends. One motor with a transmission to rotate both mirrors could also be employed. A brushless DC motor and a hysteresis synchronous motor are examples of suitable rotator means.

Instead of the second rotator means, a reciprocating scanner element having a linear scan mirror of the type described and claimed in U.S. Pat. No. 4,496,831, the entire contents of which are incorporated herein by reference, can be substituted to move the light cone impinging on the scan mirror along a scan line. In this case, if the locus on the scan mirror is a circle, then the scan pattern on the reference plane will be a plurality of circles arranged in an overlapping relationship along a linear row.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
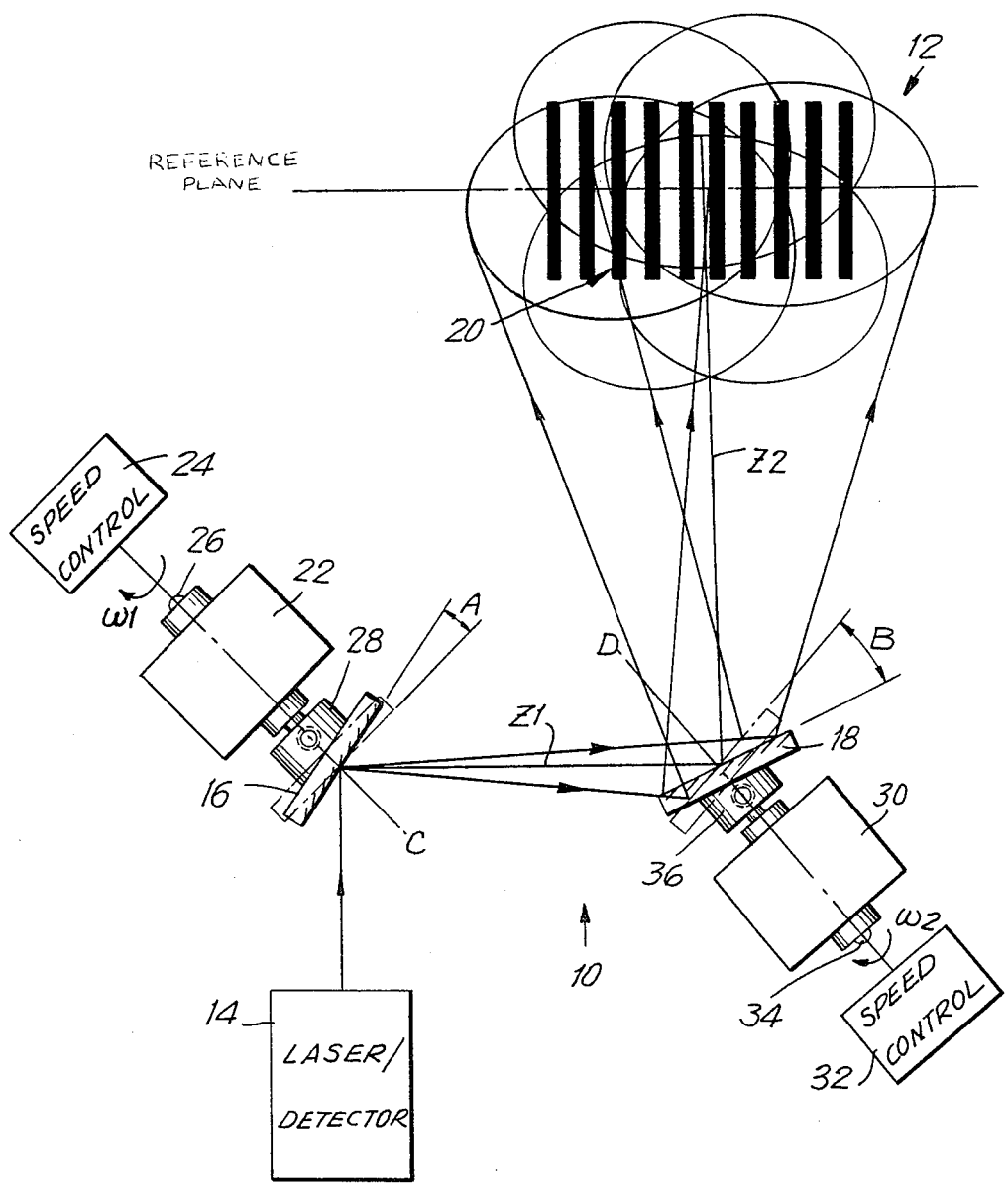
FIG. 1 is a diagrammatic view of a preferred embodiment of the invention.
Figure 2:
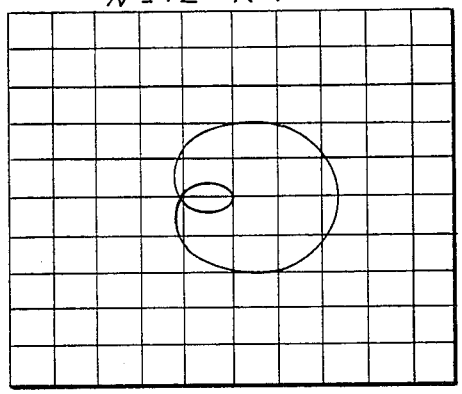
FIGS. 2–11 are multidirectional scan pattern examples generated by the embodiment of FIG. 1.
Figure 3:
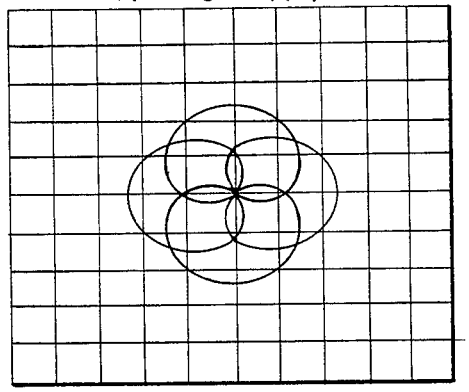
Figure 4:
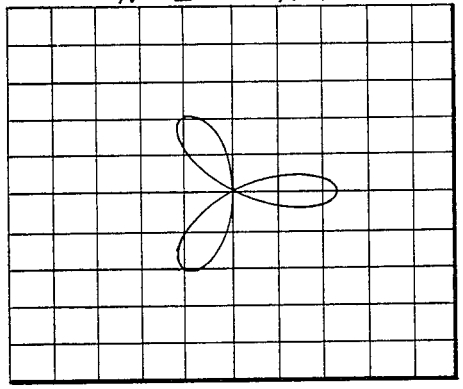
Figure 5:
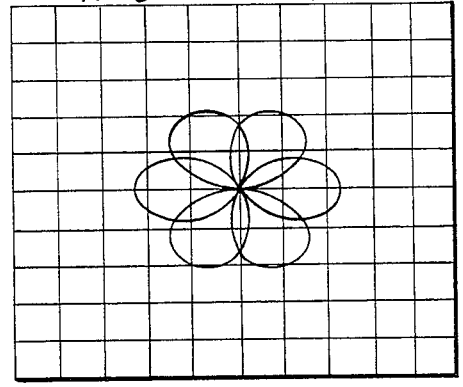
Figure 6:
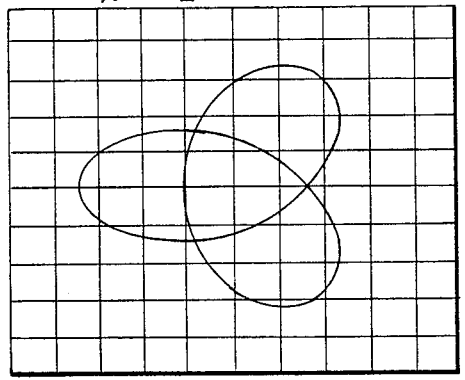

Referring to FIG. 1, reference numeral 10 generally identifies a multidirectional optical scanner for generating a multidirectional scan pattern 12 in a reference plane. Other multidirectional scan patterns are shown and discussed below in connection with FIGS. 2–11.

In a first embodiment, scanner 10 includes a light source, e.g. a gas laser, a semiconductor laser diode, a light emitting diode, etc. for generating light. The light is directed along an optical path to a first planar front surface mirror 16 from which the light is reflected along a first path portion of length Z1 to a second planar front surface mirror 18 from which the light is again reflected along a second path portion of length Z2 to a reference plane located away from the second mirror 18. The reference plane lies in a plane generally perpendicular to the optical path. However, for ease of illustration, the reference plane has been shown to lie in the plane of FIG. 1, whereas, in actuality, the reference plane lies in a plane normal to the plane of FIG. 1.

Also, in the preferred embodiment, the path portion Z2 is many times longer than path portion Z1 such that the inter-mirror path portion Z1 is, as a practical matter, negligible. In FIG. 1, the path portion Z1 is shown to have a non-negligible length, but this was done merely to better illustrate the invention.

In analogous manner, rather than sweeping the symbol 20, the field of view of a detector is swept in the scan pattern. Hence, in another embodiment, the reference numeral 14 identifies a detector, e.g. a photodiode or analogous light sensor operative for sensing light of variable intensity reflected off the symbol 20, and for generating an electrical signal indicative of the sensed light. In this case, reflected light is collected along path portion Z2 (in a direction opposite to the illustrated arrows) for impingement on second mirror 18 and, thereupon, the impinging light is reflected along path portion Z1 (again in a direction opposite to the illustrated arrows) for impingement on first mirror 16 and, thereupon, the light is reflected toward the detector 14.

Hence, either the symbol itself, or the field of view of the detector, is scanned with the scan pattern 12. In still another embodiment, both the symbol and the field of view are simultaneously scanned, and this simultaneous scanning is employed in retroreflective scanners.

In order to generate the scan pattern, according to one embodiment, the first 16 and second 18 mirrors are mounted on first and second rotator means at respective tilt angles A, B, and are rotated about respective axes C, D at respective angular speeds $\omega_1, \omega_2$.

Specifically, a reversible or unidirectional electrical motor 22 under the control of a speed controller 24 is operative to rotate output shaft 26 in either circumferential direction at angular speed $\omega_1$ about axis C. A support 28 is mounted at one end of shaft 26 for joint rotation therewith. The support has an outer inclined end on which the first mirror 16 is mounted, e.g. by adhesion, for joint rotation. The first mirror 16 is inclined at a first tilt angle of inclination A.

Similarly, a reversible or unidirectional electrical motor 30 under the control of a speed controller 32 is operative to rotate output shaft 34 in either circumferential direction at angular speed $\omega_2$ about axis D. A support 36 is mounted at one end of shaft 34 for joint rotation therewith. The support has an outer inclined end on which the second mirror 18 is mounted, e.g. by adhesion, for joint rotation. The second mirror 18 is inclined at a second tilt angle of inclination B.

In operation, the light beam reflected by the rotating first tilted mirror 16 describes a conical surface in space. Since the mirror 16 is tilted at angle A, the half-angle of the light cone extending between the mirrors is 2A. If the second mirror 18 were oriented normal to the optical axis of path portion Z1, then the locus of the light cone on the second mirror would be a circle. However, since the second mirror 18 is oriented at an angle to the optical axis of path portion Z2, the locus on the second mirror is an ellipse. Each point of the ellipse on the second mirror now serves as the point of origination of another cone. The net motion of both rotating mirrors produces multidirectional scan patterns, representative ones of which are shown in FIG. 2–11. As described below, the pattern itself is a function of the angular speeds, the directions of rotation, and the magnitudes of the inclination angles, as well as the length of the optical path.

For ease of description, the letter N denotes the ratio of the angular speed of the second mirror to that of the first mirror; the letter K denotes the ratio of the magnitude of the inclination angle of the second mirror to that of the first mirror; a + sign in front of the letter N indicates that both mirrors rotate the beam in the same direction; and a − sign in front of the letter N indicates that both mirrors rotate the beam in opposite directions; and the letter Z indicates the total distance along the optical path from the first mirror to the reference plane ($Z = Z1 + Z2$; $Z \gg Z1$).

If N is positive and an integer, then the scan pattern is closed on itself and is characterized by interior loops, the number of loops being (N+1). The longest dimension of the pattern $P = (4A + 4B)Z$. Attention is drawn to FIGS. 2 and 3 for the cases where N = +2 and +5, and where K = 1.

If N is negative and an integer, then the scan pattern is still closed, but is characterized by exterior petals, the number of petals being (N+1). The longest dimension of the pattern $P = (4A + 4B)Z$. Attention is drawn to FIGS. 3 and 4 for the cases where N = −2 and −5, and where K = 1.

Changing the magnitude of the tilt angles, in turn, changes the overall size and longest dimension of the pattern. Attention is drawn to FIGS. 6 and 7 for the cases where N = −2 and −5, and where K = 2. Hence, by doubling the tilt angle ratio, as compared to FIGS. 4 and 5, the overall longest dimension of the scan pattern is correspondingly increased.

If N is not an integer, then the pattern is not closed, but is open.

Figure 7:
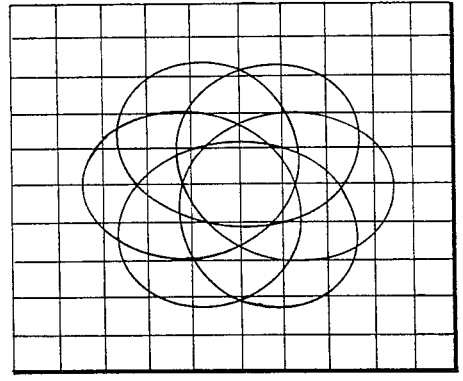
Figure 8:
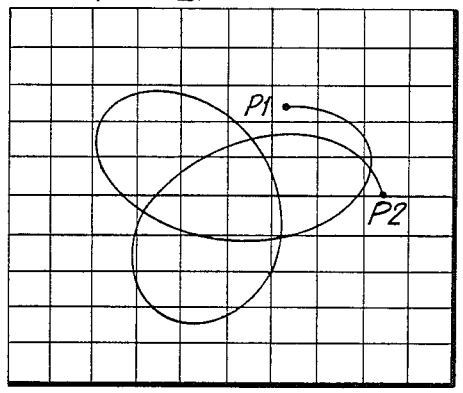
Figure 9:
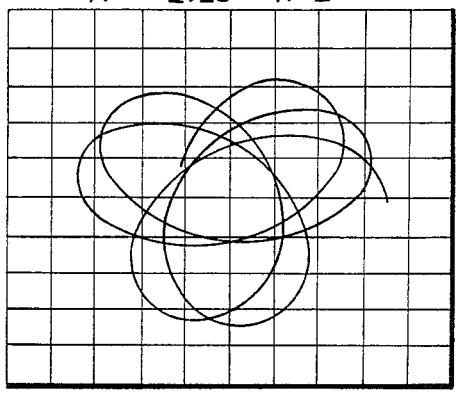
Figure 10:
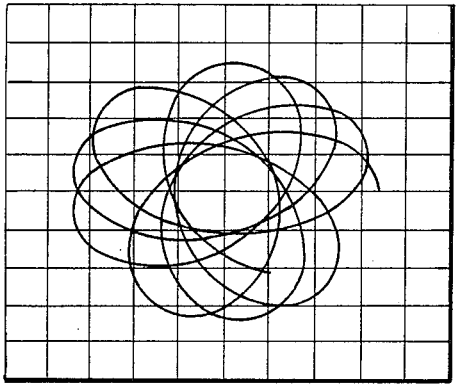
Figure 11:
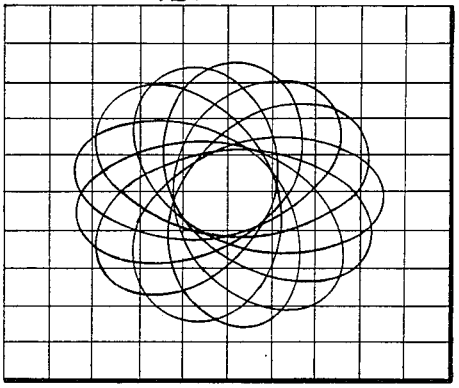

FIG. 8 shows the case where N = −2.25 and K = 2. The scan is open, i.e. does not close upon itself as in FIGS. 2–7. Note that points P1 and P2 representing the beginning and end points of the pattern are spaced apart. During the first revolution of the slower mirror 16 or 18, the scan starts at point P1, traces the pattern shown in FIG. 8 and ends at point P2. During the second revolution of the slower mirror, the same scan pattern is traced, this time the entire scan pattern being precessed about an axis normal to the reference plane by an angular distance equal to the fractional part of N multiplied by 360°. Thus, in this case where the fractional part = 0.25, then the angular distance of the precessing equals $0.25 \times 360° = 90°$. Hence, it will take four revolutions of the slower mirror to close the pattern, and this is shown in FIG. 11. FIG. 10 shows the precessed pattern after the third revolution of the slower mirror, and FIG. 11 shows the precessed pattern after the fourth revolution of the slower mirror.

As described earlier, the size of the scan pattern is determined by the tilt angles of the mirrors and the distance between the second mirror and the symbol. For small tilt angles, the size of the scan pattern equals $(4A + 4B)Z$. For example, if A = B = 4° (0.07 radians) and if Z = 7", the size of the scan pattern is 4.4" which is slightly longer than the longest bar code symbol.

The tilt angles can be fixed or adjustable. For example, a set of supports similar to supports 28, 36 can be provided, with each support having an inclined end pre-set to a different angle. A user would then select the appropriate support for a particular application.

Figure 12:
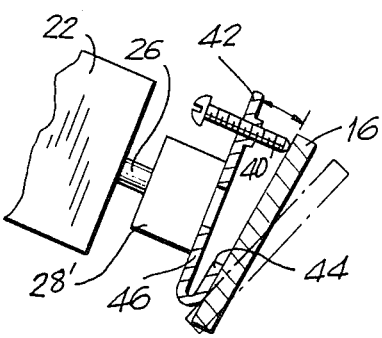
FIG. 12 is an alternative tilt angle adjusting arrangement for use with the embodiment of FIG. 1.

Otherwise, as shown in FIG. 12, mirror 16 is adjustably set to any desired tilt angle by turning adjusting screw 40 whose free end bears against one side of a rear surface of mirror 16. The screw is threaded in a radial flange 42 mounted on a support 28'. The opposite side of the rear surface of mirror 16 is connected to one leg 44 of a hinge whose other leg 46 is mounted on the cylinder 28'.

The speed controllers 24, 32 are conventional speed control systems. If motors 22, 30 are DC motors, then their speeds can be very accurately varied by the application of a variable control voltage. With constant excitation or energization of the field windings of a shunt motor, the speed is largely dependent on the voltage of the field current supplied to it. By means of a field rheostat, the voltage of the current supplied to the motor can be adjusted to obtain "infinitely variable" speed control and also to reverse the direction of rotation, this being done by reversing the direction of the field current.

Other than such analog-type controls, digital-type controllers can also be employed to cause the motors to run at discrete speeds, each speed determined by the magnitude of a control voltage or current. Such discrete speeds can be switched in and out of operation by one or more switches advantageously mounted on the system and within ready access of a user. For example, the manual actuation of one momentary action switch on a hand-held head in a laser scanning system can cause the speeds and rotation directions to be set to generate the precessing scan pattern depicted in FIGS. 8-11, and the manual actuation of another such switch on the head can cause the generation of the scan pattern of FIG. 7. The choice of the pattern depends on the application. Of course, rather than the manual actuation of switches, the scan patterns can be automatically generated in a predetermined sequence. For example, a microprocessor can be programmed to automatically change the speeds and rotation directions in a certain sequence at the onset of symbol reading. Thus, the patterns of FIGS. 2-7 could be successively generated in sequence, or in any order, or with any combination of individual patterns repeated until eventually the symbol has been successfully scanned and read.

The linear speed of a beam spot traveling along any of the above scan patterns is an important system parameter in symbol reading applications because it determines the response time of the signal processing and decoding electronic circuitry operative for processing the electrical signals generated by the detector into data descriptive of the bar code symbol. The spot speed is a complex function of the angular speeds $\omega_1$, $\omega_2$, the tilt angles A,B and the distance Z. For the above-described multidirectional patterns, the spot speed changes sinusoidally as the spot travels along a pattern. The linear spot speed due to each mirror is determined by:

$$V(inches/sec) = 2\pi\omega(rev/sec)R(inches)$$

where R is the radius of a circle produced by either mirror.

If $V_1$ and $V_2$ are the linear spot speeds provided by first mirror 16 and second mirror 18, respectively, then the maximum speed $V_{MAX}$ within the pattern is $(V_1+V_2)$ and the minimum speed $V_{MIN}$ within the pattern is $(V_2-V_1)$ Assuming that $V_2 >> V_1$, the average spot speed is $V_2$.

As a numerical example, assume that $\omega_2 = 60$ rev/sec and $\omega_1 = 15$ rev/sec. Further, assume that each mirror describes a circle of radius equal to 1.5 inches, and that the mirrors counterrotate. The scan pattern will have (N+1)=5 petals. The size of the scan pattern will be about 6 inches. The spot speed $V_1 = 141$ in/sec. The spot speed $V_2 = 565$ in/sec. The average spot speed is $V_2 = 565$ in/sec. $V_{MAX}$ is $V_1 + V_2 = 706$ in/sec. $V_{MIN}$ is $V_2 - V_1 = 424$ in/sec.

The above numerical example represents a preferred laser scanning application for reading bar code symbols using relatively low speed analog signal processing and decoding circuitry. The above spot speed variation between $V_{MAX}$ and $V_{MIN}$ is less than that, normally encountered in linear scan or Lissajous scan patterns.

Typically, the higher the spot speed, the more complex and expensive will be the signal processing and decoding circuitry since the circuitry must respond to the maximum spot speed. The lower spot speed achieved by this invention compared to the known art permits simpler, less expensive electrical circuitry to be employed. Also, the average spot speed for a given number of frames per second is less according to this invention than in the known designs.

Also, the two-mirror scanner of this invention has no "dead" time. The spot is always in the scan pattern. There are no locations at which the beam spot speed equals zero, as is the case for scanners of the type described in U.S. Pat. Nos. 4,387,297 or 4,409,470 or 4,369,361, for example.

In principle, all the portions of the scan pattern can be used for decoding. As shown in FIG. 7, for example, there are portions of the pattern with relatively straight and gently curved lines useful for decoding provided the radius of curvature of the line is such that the line covers at least one-half of the symbol.

In addition, as shown in FIG. 7, the scan pattern of this invention has an N-fold symmetry, and a 100% scanning efficiency. The pattern is equally and highly dense over the field of view. There are fewer non-useful, tightly curved pattern portions, as was the case for Lissajous patterns. There are more useful, gently curved pattern portions having large radii of curvature, each capable of scanning a symbol and/or the field of view of a detector.

The two-mirror scanner shown in FIG. 1 is a non-complicated, lightweight, miniature arrangement for generating fairly complex multidirectional scan patterns. It can be packaged in a hand-held head for reading bar code symbols (as shown, for example, in U.S. Pat. No. 4,387,297 or 4,409,470),or in a desk-top workstation (as shown, for example, in U.S. Pat. No. 4,369,361). It can be easily packaged underneath a countertop in a retail, point-of-sale application. It can be easily packaged in a workstation whose head is supported on an adjustable gooseneck-type support above a work surface in a scan-above or side-scan mode.

Figure 13:
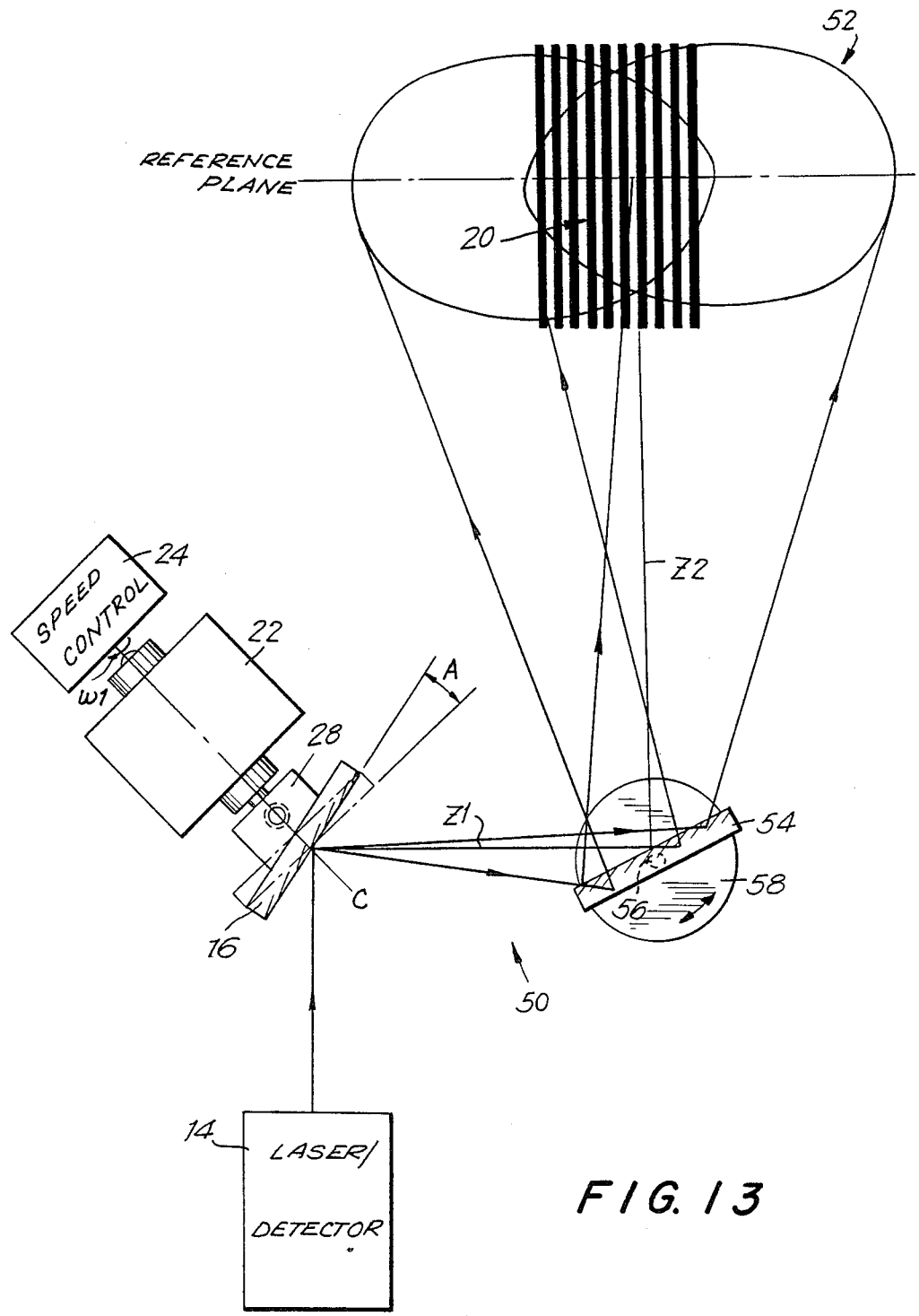
FIG. 13 is a diagrammatic view of another preferred embodiment of the invention.

In a modification of the FIG. 1 embodiment, FIG. 13 shows another embodiment 50 for generating a scan pattern 52, which is identical to embodiment 10, except that the second rotator has been replaced by a scanner element of the type described in U.S. Pat. No. 4,496,831, the entire contents of which are incorporated by reference herein. It will be noted that a second planar, front surface, mirror 54 is mounted on, and in a plane parallel to, an output shaft 56 of a reciprocating motor 58. The mirror 54 is respectively oscillated in the directions of the double-headed arrow. The ellipse formed on mirror 54 is then moved linearly across the symbol 20 between the two end traces shown.

The scan patterns generated by this invention can be used not only for bar code reading applications, but also in search systems, visual entertainment systems, precision pointing, etc.

Rather than mirrors, prisms or analogous optical elements arranged to direct the light beam along the optical path may be utilized.

The precessing pattern, which rotates in space about an axis generally perpendicular to the plane in which the symbol lies (see FIGS. 8–11), is of particular advantage in those application where the symbol is stationary, or where the height of the symbol is truncated. The space-rotating pattern minimizes the tendency for the symbol not to be scanned, since during the rotation of the pattern, the likelihood increases that at least one of the scan lines of the pattern will cross the symbol. This is to be contrasted with Lissajous patterns which have a translating wave characteristic.

It will be understood that each of the elements described above, or two or more together, also may find a useful application in other types of constructions differing from the types described above.

While the invention has been illustrated and described as embodied in a multidirectional optical scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A multidirectional optical scanner, comprising:
   (A) director means for directing light along an optical path to a light-reflecting target located in the vicinity of a reference plane lying generally normal to the optical path, and from the target in a field of view, said director means including
      (i) first and second light-directing optical elements spaced apart along the path;
   (B) scanner means for multidirectionally scanning at least one of the target and the field of view, said scanner means including
      (i) first rotator means for mounting the first element at a first tilt angle of inclination relative to a first axis, and for rotating the first element about the first axis at a first angular speed to generate a first light cone extending along the path between the elements, and
      (ii) second means for moving the second element and the first light cone impinging thereon to form a multidirectional scan pattern in the reference plane; and
   (C) control means for changing the multidirectional scan pattern in the reference plane.

2. The multidirectional optical scanner according to claim 1, wherein the second means is a second rotator means for mounting the second element at a second tilt angle of inclination relative to a second axis, and for rotating the second element about the second axis at a second angular speed to generate a second light cone extending along the path between the second element and the reference plane.

3. The multidirectional optical scanner according to claim 2, wherein the elements are mirrors, and wherein said control means is operative for changing the shape of the scan pattern, and includes means for adjustably setting the first and second angular speeds to different velocities, each velocity corresponding to a different shape of the scan pattern.

4. The multidirectional optical scanner according to claim 2, wherein the elements are mirrors, and wherein said control means is operative for changing the size of the multidirectional scan pattern in the reference plane, and includes means for adjustably setting the first and second inclination angles to different magnitudes, each magnitude corresponding to a different size of the scan pattern.

5. A multidirectional optical scanner, comprising:
   (A) director means for directing laser light along an optical path to a laser light-reflecting coded symbol located in the vicinity of a reference plane lying generally normal to the optical path, and from the symbol, said director means including
      (i) first and second laser light-reflecting optical elements spaced apart along the path; and
   (B) scanner means for multidirectionally scanning the laser light across the symbol, said scanner means including
      (i) first rotator means for mounting the first element at a first tilt angle of inclination relative to a first axis, and for rotating the first element about the first axis at a first angular speed to generate a first laser light cone extending along the path between the elements, and
      (ii) second means for moving the second element and the first laser light cone impinging thereon to form a multidirectional scan pattern in the reference plane.

6. The multidirectional optical scanner according to claim 5, wherein the second means is a second rotator means for mounting the second element at a second tilt angle of inclination relative to a second axis, and for rotating the second element about the second axis at a second angular speed to generate a second laser light cone extending along the path between the second element and the reference plane.

7. The multidirectional optical scanner according to claim 6; and further comprising control means for changing the shape of the multidirectional scan pattern in the reference plane, said control means including means for adjustably setting the first and second angular speeds to different velocities, each velocity corresponding to a different shape of the scan pattern.

8. The multidirectional optical scanner according to claim 6; and further comprising sizing means for changing the size of the multidirectional scan pattern in the reference plane, said sizing means including means for adjustably setting the first and second inclination angles to different magnitudes, each magnitude corresponding to a different size of the scan pattern.

9. A multidirectional optical scanner, comprising:
   (A) director means for directing light along an optical path to a light-reflecting target located in the vicinity of a reference plane lying generally normal to the optical path, and from the target in a field of view, said director means including
      (i) first and second light-reflecting planar mirrors spaced apart along the path; and
   (B) scanner means for multidirectionally scanning at least one of the target and the field of view, said scanner means including
      (i) first rotator means for mounting the first mirror at a first tilt angle of inclination relative to a first axis, and for rotating the first mirror about the first axis at a first angular speed to generate a first light cone extending along the path between the mirrors, and (ii) second means for moving the second mirror and the first light cone impinging thereon to form a multidirectional scan pattern in the reference plane.

10. The multidirectional optical scanner according to claim 9, wherein the second means is a second rotator means for mounting the second mirror at a second tilt angle of inclination relative to a second axis, and for rotating the second mirror about the second axis at a second angular speed to generate a second light cone extending along the path between the second mirror and the reference plane.

11. The multidirectional optical scanner according to claim 10; and further comprising control means for changing the shape of the multidirectional scan pattern in the reference plane, said control means including means for adjustably setting the first and second angular speeds to different velocities, each velocity corresponding to a different shape of the scan pattern.

12. The multidirectional optical scanner according to claim 11, wherein the first and second angular speeds form a ratio, and wherein the control means forms a closed scan pattern when the ratio is an integer.

13. The multidirectional optical scanner according to claim 11, wherein the first and second angular speeds form a ratio, and wherein the control means forms an open scan pattern when the ratio is a non-integer, said control means being further operative for precessing the open scan pattern in a circumferential direction about an optical axis extending along the optical path.

14. The multidirectional optical scanner according to claim 11, wherein the control means is operative for rotating the first and second mirrors in different circumferential directions about their respective first and second axes.

15. The multidirectional optical scanner according to claim 11, wherein the control means is operative for rotating the first and second mirrors in the same circumferential direction about their respective first and second axes.

16. The multidirectional optical scanner according to claim 10; and further comprising sizing means for changing the size of the multidirectional scan pattern in the reference plane, said sizing means including means for adjustably setting the first and second inclination angles to different magnitudes, each magnitude corresponding to a different size of the scan pattern.

17. The multidirectional optical scanner according to claim 9, wherein the second means is a reciprocating drive on which the second mirror is mounted for oscillating movement.

18. The multidirectional optical scanner according to claim 10, wherein the director means includes a laser light source for generating, and for directing, laser light along the optical path to impinge on the target constituted of a bar code symbol in the vicinity of the reference plane.

19. The multidirectional optical scanner according to claim 18, wherein each rotator means includes an electrical motor having an output shaft extending along a respective axis, and wherein each mirror is mounted transversely on the output shaft.

20. A multidirectional optical scanner, comprising:
(A) director means for directing light along an optical path to a light-reflecting target located in the vicinity of a reference plane lying generally normal to the optical path, and from the target in a field of view;

(B) scanner means for multidirectionally scanning at least one of the target and the field of view to form a multidirectional scan pattern in the reference plane; and (C) precessor means for precessing the multidirectional scan pattern in space about an axis extending along the optical path.

21. The multidirectional optical scanner according to claim 20, wherein the director means includes first and second light-reflecting optical elements spaced apart along the path; and wherein the scanner means includes first rotator means for mounting the first element at a first tilt angle of inclination relative to a first axis, and for rotating the first element at a first angular speed to generate a first light cone extending along the path between the elements, and second rotator means for mounting the second element at a second tilt angle of inclination relative to a second axis, and for rotating the second element at a second angular speed to generate a second light cone extending along the path between the second element and the reference plane.

22. The multidirectional optical scanner according to claim 21, wherein the precessor means includes means for adjusting the first and the second angular speeds to a non-integral ratio.

23. In a laser scanning system for reading symbols, an arrangement for generating a multidirectional scan pattern, comprising:
(A) director means for directing laser light along an optical path to symbols of different light reflectivity located in the vicinity of a reference plane lying generally normal to the optical path, and from the symbols in a field of view, said director means including
  (i) first and second light-reflecting mirrors spaced apart along the path; and
(B) scanner means for multidirectionally scanning at least one of the symbols and the field of view, said scanner means including
  (i) first rotator means for mounting the first mirror at a first tilt angle of inclination relative to a first axis, and for rotating the first mirror about the first axis at a first angular speed to generate a first light cone extending along the path between the mirrors, and
  (ii) second rotator means for mounting the second mirror at a second tilt angle of inclination relative to a second axis, and for rotating the second mirror about the second axis at a second angular speed to generate a second light cone extending along the path between the second mirror and the reference plane, thereby forming a multidirectional scan pattern in the reference plane.

24. A method of multidirectionally scanning at least one of a target and a field of view, comprising the steps of:
(A) directing light along an optical path to a light-reflecting target located in the vicinity of a reference plane lying generally normal to the optical path, and from the target in a field of view including the step of positioning first and second light-reflecting elements along the path;
(B) mounting the first element at a first tilt angle of inclination relative to a first axis;

(C) mounting the second element at a second tilt angle of inclination relative to a second axis;

(D) rotating the first element about the first axis at a first angular speed to generate a first light cone extending along the path between the elements;

(E) rotating the second element about the second axis at a second angular speed to generate a second light cone extending along the path between the second element and the reference plane to form a multidirectional scan pattern in the reference plane; and (F) changing the multidirectional scan pattern in the reference plane.

25. The method according to claim 24, wherein the changing step includes changing the shape of the multidirectional scan pattern in the reference plane by adjustably setting the first and second angular speeds to different velocities, each velocity corresponding to a different shape of the scan pattern.

26. The method according to claim 25, wherein the setting step includes forming an integral ratio of the first angular speed compared to the second angular speed, and wherein the changing step includes forming a closed scan pattern.

27. The method according to claim 25, wherein the setting step includes forming a non-integral ratio of the first angular speed compared to the second angular speed, and wherein the changing step includes forming an open scan pattern, and precessing the open scan pattern in a circumferential direction about an optical axis extending along the optical path.

28. The method according to claim 24, wherein the rotating steps are performed by rotating the elements in different circumferential directions about their respective first and second axes.

29. The method according to claim 24, wherein the rotating steps are performed by rotating the elements in the same circumferential direction about their respective first and second axes.

30. The method according to claim 24, wherein the changing step includes changing the size of the multidirectional scan pattern in the reference plane by adjustably setting the first and second inclination angles to different magnitudes, each magnitude corresponding to a different size of the scan pattern.

31. In a laser scanning system for reading symbols, a method of generating a multidirectional scan pattern, comprising the steps of:

(A) directing laser light along an optical path to symbols having indicia of different light reflectivity located in the vicinity of a reference plane lying generally normal to the optical path, and from the symbols in a field of view including the step of positioning first and second light-reflecting elements along the path;

(B) mounting the first element at a first tilt angle of inclination relative to a first axis;

(C) mounting the second element at a second tilt angle of inclination relative to a second axis;

(D) rotating the first element about the first axis at a first angular speed to generate a first light cone extending along the path between the elements; and (E) rotating the second element about the second axis at a second angular speed to generate a second light cone extending along the path between the second element and the reference plane to form a multidirectional scan pattern in the reference plane.

* * * * *